United States Patent
Sato et al.

(10) Patent No.: US 6,330,077 B1
(45) Date of Patent: Dec. 11, 2001

(54) IMAGE FORMING APPARATUS

(75) Inventors: Kazuhiko Sato; Hiromitsu Horie; Eiji Sasaki; Takao Kamata, all of Kanagawa (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 09/199,043

(22) Filed: Nov. 24, 1998

(30) Foreign Application Priority Data

Jan. 30, 1998 (JP) .................................................. 10-019697

(51) Int. Cl.[7] .............................. G03G 21/00; G06K 9/46
(52) U.S. Cl. .............................................. 358/1.9; 382/239
(58) Field of Search ........................... 358/1.9; 382/237, 382/239, 254, 256–259, 260–269

(56) References Cited

U.S. PATENT DOCUMENTS

| | | | |
|---|---|---|---|
| 5,029,108 | * 7/1991 | Lung | 364/519 |
| 5,333,038 | 7/1994 | Mizoguchi et al. | 355/208 |
| 5,438,437 | 8/1995 | Mizoguchi et al. | 358/518 |
| 5,532,828 | * 7/1996 | Mituse | 358/298 |
| 5,757,982 | * 5/1998 | Tepmongkol | 382/298 |
| 5,956,470 | * 9/1999 | Eschbach | 358/1.9 |

FOREIGN PATENT DOCUMENTS

| | | |
|---|---|---|
| 60-194472 | 10/1985 | (JP) . |
| 1-284173 | 11/1989 | (JP) . |
| 4-185460 | 7/1992 | (JP) . |
| 4-189563 | 7/1992 | (JP) . |
| 4-351065 | 12/1992 | (JP) . |
| 4-369968 | 12/1992 | (JP) . |
| 6-90355 | 3/1994 | (JP) . |
| 9-270915 | 10/1997 | (JP) . |

* cited by examiner

Primary Examiner—Thomas D. Lee
Assistant Examiner—Stephen Brinich
(74) Attorney, Agent, or Firm—Armstrong, Westerman, Hattori, McLeland & Naughton, LLP.

(57) ABSTRACT

An image forming apparatus in which a character/line drawing emphasizing section previously stores a correlation between diameter of dots and position of remarked dots to be varied (including movement of a dot position) for each dot pattern in a table, detects a dot pattern matching a dot pattern based on dot image data inputted by a pattern detecting section, and varies and corrects (including movement of a dot position) the diameter of a dot corresponding to a position of a remarked dot in the dot pattern.

8 Claims, 11 Drawing Sheets

IMAGE FORMING APPARATUS

FIELD OF THE INVENTION

The present invention relates to an image forming apparatus, and more particularly to an image forming apparatus for forming a dot image corresponding to a dot pattern based on the image data.

BACKGROUND OF THE INVENTION

An image forming apparatus for forming a dot image is generally applied in a dot-image output device such as a laser-beam printer and a CRT. For example, the laser-beam printer employs an image exposing system or a background exposing system for forming a dot image by providing ON/OFF controls to laser beams according to inputted bitmap data.

A diameter of the dot is maintained substantially constant at a specified value according to a period of laser-beam emission or according to the power of light during formation of a dot image. Then, generally, the dot image is subjected to smoothing processing according to the type of the dot image or according to the resolution when recording is executed.

In the conventional type of image forming apparatus described above, in addition to maintaining a dot diameter constant at a specified value regardless of a type of an output image, since many cases where characters are reproduced as an output image, a larger diameter of a dot suitable for reproduction of characters has been employed. For this reason, when an output image is characters, an optimal dot image for the above purpose can be formed. However, when an output image is an image or a dot image with open characters or the like, a portion with white dots existing between black dots is compressed according to a distance between the dots due to characteristics specific to an output image, which makes reproducibility of image quality lower.

This type of problem occurs not only in printing with the dot-image output device such as a laser-beam printer, but also in displaying with the dot-image output device such as a CRT.

SUMMARY OF THE INVENTION

It is an object of the present invention to provide, for solving the problems described above, an image forming apparatus that can improve reproducibility of image quality according to characteristics of an output image.

With the present invention, a correlation between each dot diameter and each position of remarked dots to be varied for each dot pattern is previously stored, and when a dot pattern matching a dot pattern based on inputted dot image data is detected, a dot diameter corresponding to the position of the remarked dot in the dot pattern is varied and corrected, so that a dot image appropriate for a dot pattern can be formed, and with this feature, it is possible to improve reproducibility of image quality according to characteristics of an output image.

With the present invention, a dot diameter is varied and corrected in each dot pattern in which a single remarked dot or remarked dots aligned in any of horizontal, vertical or diagonal directions are surrounded by dots having a different color or gray scale from that of remarked dot or dots, and in which between first and second lines of remarked dots have at least three or more lines with dots having a different color or gray scale from that of the remarked dots, so that it is possible to reproduce a point of a remarked dot and a line with remarked dots so that the point and the line can be recognized without being filled up by the surrounding dots having a different color or gray scale, and appropriately maintain the density of the image pattern.

With the present invention, an output dot image is formed by performing pulse width modulation, output current modulation or both to the dot image data in which the dot diameter has been varied and corrected, so that it is possible to realize image formation optimal to an output mode.

With the present invention, when a dot pattern matching that in dot pattern groups each having a different priority is detected in the inputted dot image data, dot image data corrected by using the highest priority dot pattern group is selected and outputted, so that optimal correction can be performed as required according to the state of the input dot image, and with this feature, it is possible to preferentially improve image quality of an outside shape.

With the present invention, when a matching dot pattern is not detected, each dot diameter based on the inputted dot image data is corrected to the default size, and the corrected dot image data is selected and outputted, so that any input dot image having no specified dot pattern can even be subjected to a minimum default correction, and with this feature, it is possible to improve image quality of an outside shape even in any of input dot images.

With the present invention, a dot diameter is varied and corrected in each dot pattern in which a single remarked dot or remarked dots aligned in any of horizontal, vertical or diagonal directions are surrounded by dots having a different color or gray scale from that of remarked dot or dots, and in which between first and second lines of remarked dots have at least three or more lines with dots having a different color from that of the remarked dots, so that it is possible to reproduce a point of a remarked dot and a line with remarked dots so that the point and the line can be recognized without being filled up by surrounding dots having a different color or gray scale, and appropriately maintain the density of the image patterns.

With the present invention, an output dot image is formed by performing pulse width modulation, output current modulation or both to the selected and outputted dot image data, so that it is possible to realize image formation optimal to an output mode.

With the present invention, when a dot pattern based on inputted dot image data requires both of smoothing processing and emphasizing processing, the smoothing processing is preferentially outputted over the emphasizing processing, so that optimal correction can be performed as required according to the state of input dot image, and with this feature, it is possible to preferentially improve the image quality of an outside shape.

With the present invention, when corresponding dot pattern is not detected, dot diameter based on inputted dot image data is corrected to the default size, and the corrected dot image data is selected and outputted, so that any input dot image having a dot pattern not required to be subjected to smoothing processing or emphasizing processing can even be subjected to minimum default correction, and with this feature, it is possible to improve the image quality of an outside shape even in any of input dot images.

Other objects and features of this invention will become apparent from the following description with reference to the accompanying drawings.

DESCRIPTION OF THE PREFERRED EMBODIMENTS

Detailed description is made hereinafter for preferred embodiments of an image forming apparatus according to the present invention with reference to the related drawings.

Figure 1:
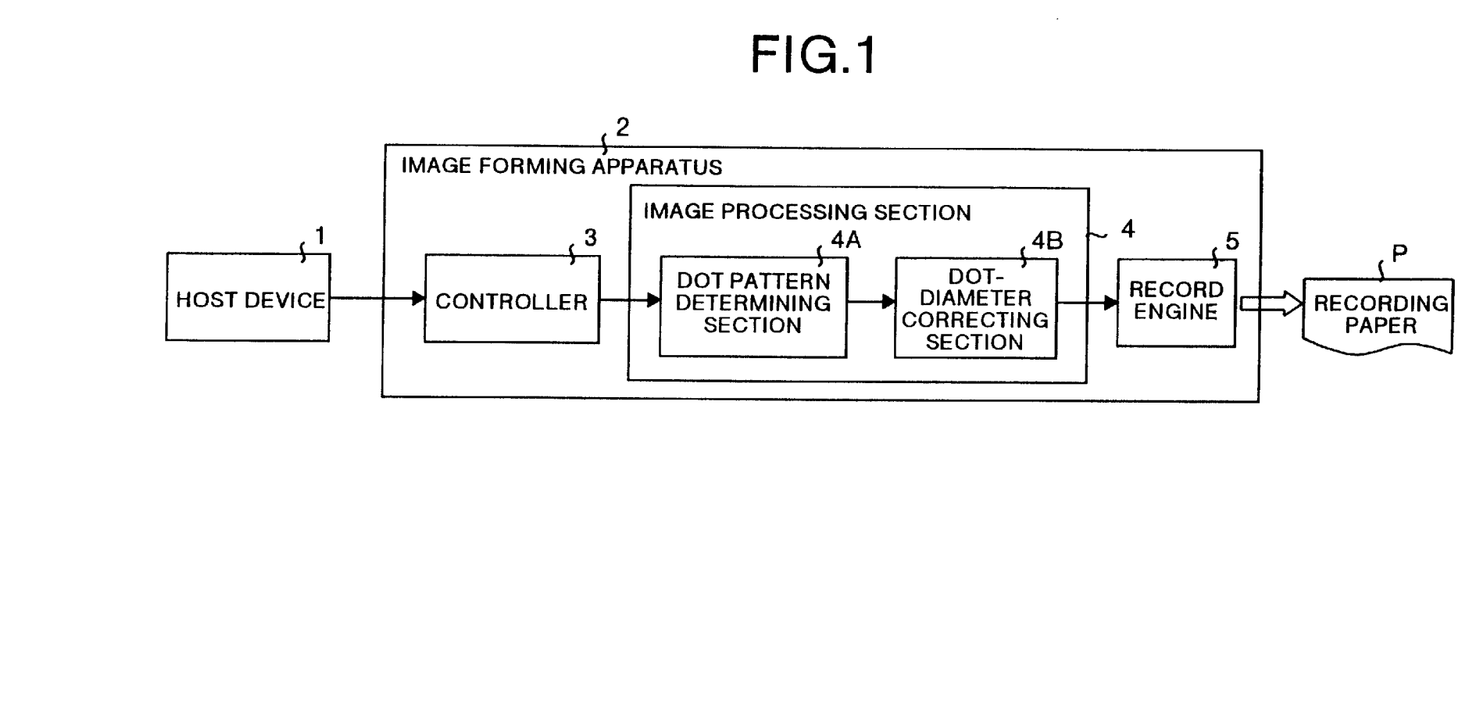
FIG. 1 is a block diagram showing an image processing system in which an image forming apparatus according to Embodiment 1 of the present invention is applied.

At first, a general configuration is described. FIG. 1 is a block diagram showing an image processing system in which an image forming apparatus according to Embodiment 1 of the present invention is applied. This image processing system comprises, as shown in FIG. 1, a host device 1 and an image forming apparatus 2 for recording an image onto a recording paper P.

The host device 1 is a host computer for generating image data for recording. The image forming apparatus 2 is a device such as a laser-beam printer. This laser-beam printer is, as well known, a recording device comprising printing steps of forming a latent image on a surface of a photoconductive drum with laser beams, developing this latent image with toner, and transferring the image onto a recording paper.

This image forming apparatus 2 comprises, as shown in FIG. 1, a controller 3, an image processing section 4, and a record engine 5. The controller 3 receives image data from the host device 1. The image processing section 4 generates video signals used for forming data for a dot image according to image data sent from the controller 3. The record engine 5 records an image on a recording paper P according to the dot image data, namely the video signals generated by in the image processing section 4.

The image processing section 4 comprises, when its functions are considered, a dot pattern determining section 4A and a dot-diameter correcting section 4B. The dot pattern determining section 4A determines a dot pattern according to the image data sent from the controller 3, while the dot-diameter correcting section 4B varies and corrects the diameter of a dot to a dot diameter appropriate for a required dot according to the dot pattern.

Figure 2:
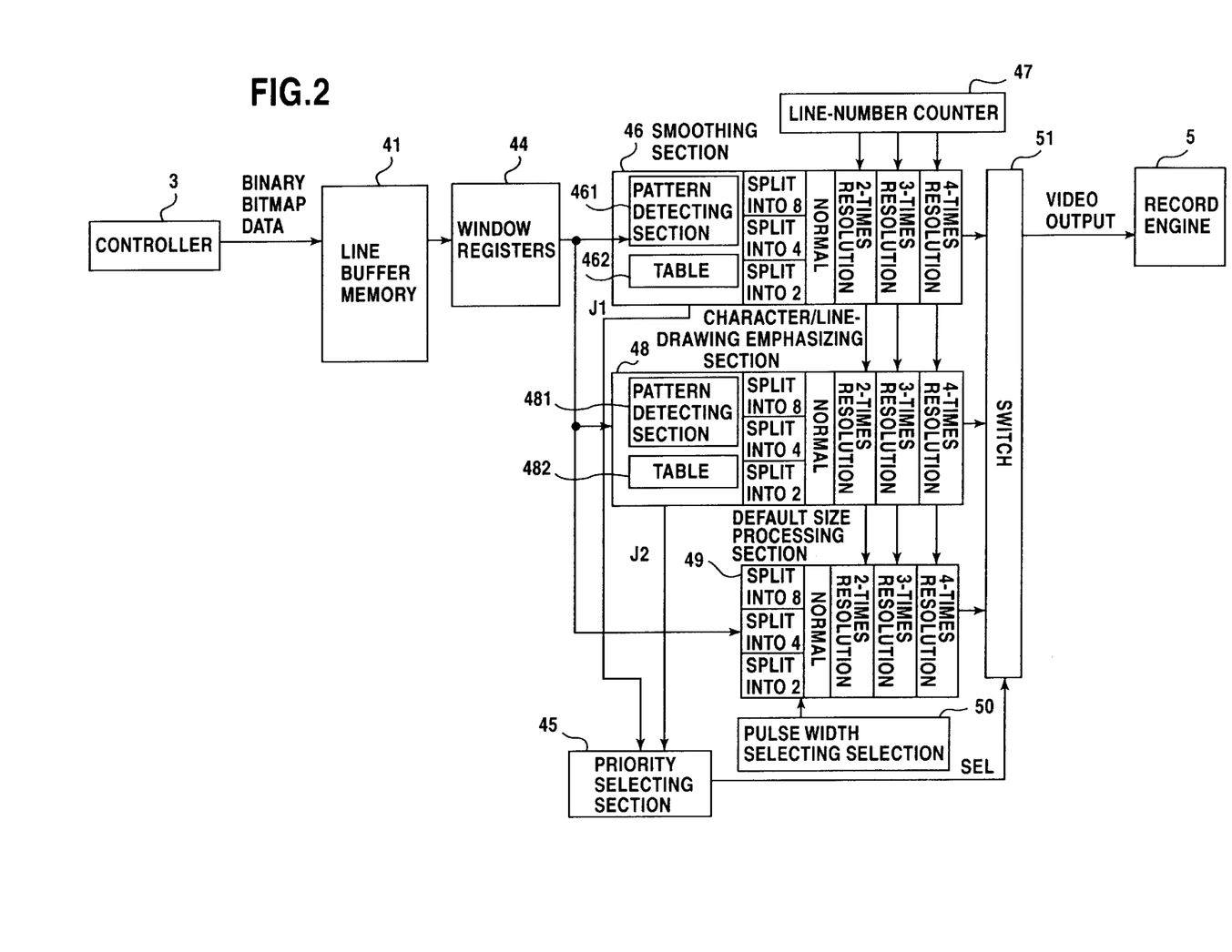
FIG. 2 is a block diagram showing configuration in detail of the image processing section shown in FIG. 1.

Next, the image processing section 4 is described. FIG. 2 is a block diagram showing detail configuration of the image processing section 4. This image processing section 4 comprises a line buffer memory 41, a window registers 44, a priority selecting section 45, a smoothing section 46, a line number counter 47, character/line-drawing emphasizing section 48, a default size processing section 49, a pulse width selecting section 50 and a switch 51.

The line buffer memory 41 stores image data sent from the controller 3, namely stores the binary bitmap data for a plurality of rasters in a plurality of line buffers. The window registers 44 puts out only a window of a specified size from the binary bitmap data stored in the line buffer memory 41.

The smoothing section 46 subjects the dot image according to the image data sent from the window registers 44 to smoothing processing. This smoothing section 46 comprises a pattern detecting section 461 and a table 462. Stored in the table 462 are dot patterns as a reference for determination required for executing smoothing processing. Table 462 also stores a correlation between each of the dot patterns and data for correction required to move a dot pattern to a dot position suitable for smoothing as well as to vary a dot diameter.

A pattern with black dots which are apart by n (n=1, 2, 3 . . .) dot (s) from a point at which a jaggy start is an example of the dot pattern. Then, the pattern detecting section 461 detects a dot pattern matching the dot pattern based on input image data in the table 462, and when a pattern is detected sends out a detection signal J1 to the priority selecting section 45.

The line number counter 47 is used in smoothing processing when the image data having a resolution of ½, ⅓ or ¼ of the engine resolution is inputted. For example, one line of the input image data corresponds to two lines, three lines and four lines depending on the resolution of 2 times, 3 times and 4 times respectively.

Accordingly, this line number counter 47 counts a line outputted from each processing (the smoothing section 46, character/line-drawing emphasizing section 48 and default size processing section 49) as a 1st line, a 2nd line, a 3rd line or a 4th line according to its resolution.

Specifically, the line number counter 47 counts up by one each time when a line is outputted. For example, in a case of two times-resolution, only up to two lines need to be counted, so that the counter is changed from "0" to "1", and then reset. In a case of 3 times resolution, only up to three lines need to be counted, so that the counter is changed from "0", "1", to "2", and then reset. Then, in a case of 4 times resolution, only up to four lines need to be counted, so that the counter is changed from "0", "1", "2", to "3", and then reset.

As described above, in each of the correcting sections (the smoothing section 46, character/line-drawing emphasizing section 48 and default size processing section 49), output of a correction line is switched according to a counter in the line number counter 47, and the optimal smoothing processing, emphasizing processing described later, or default processing at each of the 2 to 4 times higher resolution can be realized.

The character/line-drawing emphasizing section 48 subjects dot image according to the image data sent from the window registers 44 to edge enhancement suitable for characters and line drawings or the like. Stored in the table 482 are dot patterns as a reference for determination required for executing character/line-drawing emphasizing processing, and each of the dot patterns is stored therein in correlation to data for correction required to vary a dot diameter to a diameter thereof as well as to move a dot pattern to a dot position each suitable for enhancement. The pattern determining section 481 detects a dot pattern matching the dot pattern according to the input image data in the table 482, and when a pattern is detected sends out a detection signal J2 to the priority selecting section 45.

The default size processing section 49 is a block for outputting a dot size preset in case of a black dot. This default size processing section 49 does not require pattern matching like the other correcting sections do, and does not output a dot size when a remarked dot at the center of a window is a white dot, however, outputs a specified default dot size when the dot is a black dot.

Herein, the pulse width selecting section 50 selectably holds the dot size specified by default or the pulse width specified by default. It should be noted that the contents held in this pulse width selecting section 50 can arbitrarily be set by an external unit such as a controller, a variable resistor and a variable voltage.

The priority selecting section 45 preferentially selects one from the smoothing section 46, character/line-drawing emphasizing section 46 and the default size processing section 48 in order to switch the switch 51, and outputs a selection signal SEL for the selected unit to the switch 51. Concretely, the priority selecting section 4 gives a priority to an output from the smoothing section 46. When it receives a detection signal J1 from the smoothing section 46 and detection signal J2 from the character/line-drawing emphasizing section 48. The priority selecting section 4 gives a priority to an output from the character/line-drawing emphasizing section 48 when if does not receive the detection signal J1 from the smoothing section 46 but receives the detection signal J2 from the character/line-drawing emphasizing section 48. The priority selecting section 45 gives a priority to an output from the default size processing section 49 when it does not receive a detection signal from either of the smoothing section 46 and character/line-drawing emphasizing section 48.

The switch 51 is connected to output terminals of the priority selecting section 45, character/line-drawing emphasizing section 48 and default size processing section 49 each, switches to the output instructed by a selection signal SEL from the priority selecting section 45, and outputs a video signal to the record engine 5. Specifically, the switch 51 switches to the output from the smoothing section 46 when it receives an instruction to select the smoothing section 46 from the priority selecting section 45. The switch 51 switches to the output from the character/line-drawing emphasizing section 48 when it receives an instruction to select the character/line-drawing emphasizing section 48 from the priority selecting section 45. The switch 51 switches to the output from the default size processing section 49 when it receives an instruction to select the default size processing section 49 from the priority selecting section 45.

Figure 3:
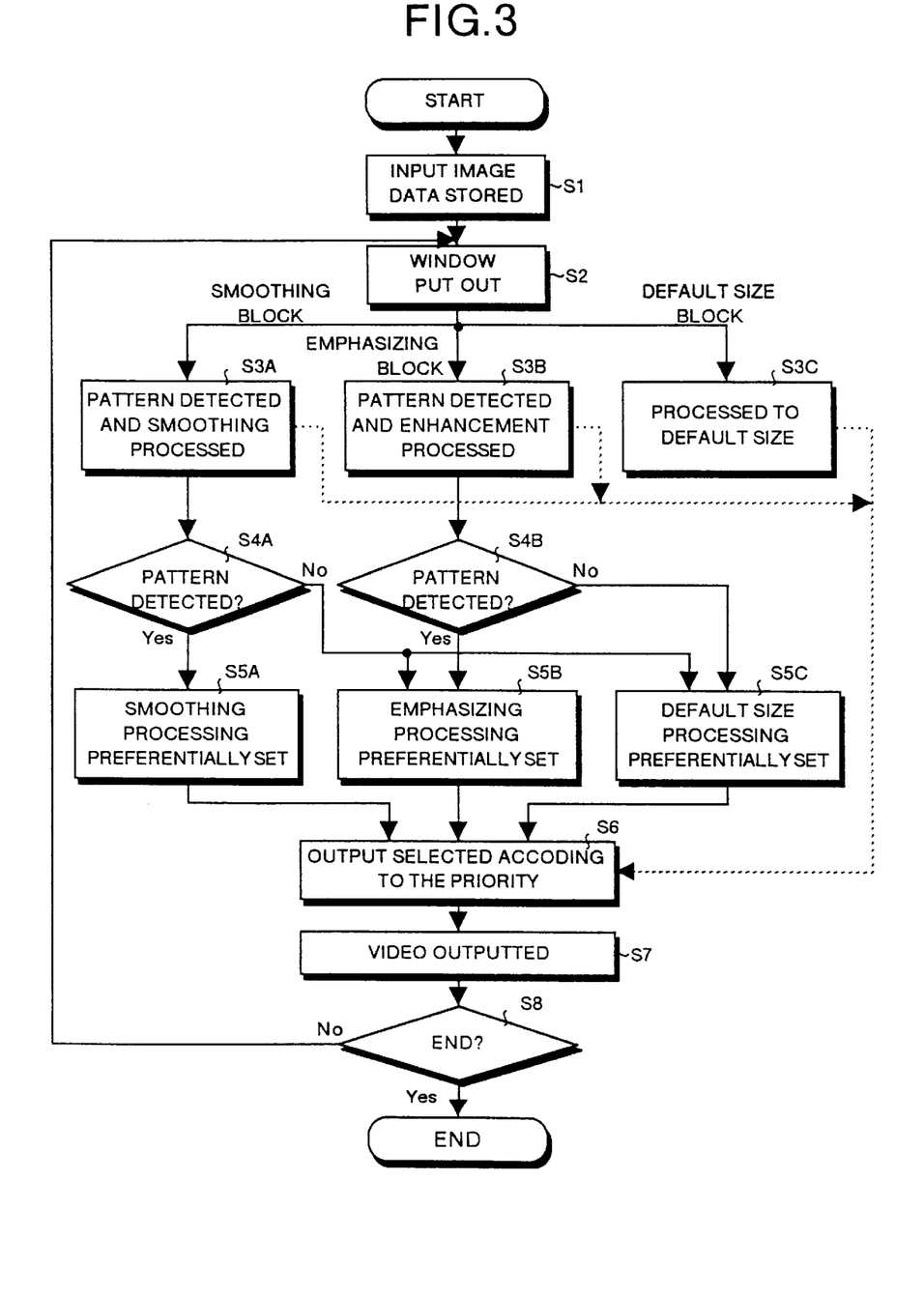
FIG. 3 is a flow chart for explaining the operations according to Embodiment 1.

Next, operations are explained. FIG. 3 is a flow chart that explains the operations according to Embodiment 1. In the image processing section 4 shown in FIG. 2, when image data (binary bitmap data) is received from the controller 3, the input image data is stored in the line buffer memory 41 (step S1).

The input image data stored in the line buffer memory 41 is put out as a window having a specified size by the window registers 44, and outputted to the smoothing section 46 (smoothing block), character/line-drawing emphasizing section 48 (emphasizing block), and the default size processing section 48 (default size block) each provided in the downstream side from the window (step S2).

The smoothing section 46 executes processing of detecting a dot pattern matching the dot pattern for the dot image based on the input image data by referring to the table 462. At this time, when the matching dot pattern is detected, the position of the remarked dot correlated to the dot pattern is moved and corrected (step S3A).

Then, when a matching pattern is detected as described above (step S4A), smoothing processing as correction processing is given a priority by the priority selecting section 45. In this case, the detection signal J1 is outputted (step S5A).

If a matching pattern is not detected in step S4A, the correction processing will be either the emphasizing processing or the default size processing. Concurrently when the processing is executed in the smoothing section 46, the pattern detection is also executed in the character/line-drawing emphasizing section 48. Namely, the character/line-drawing emphasizing section 48 executes processing of detecting a dot pattern matching the dot pattern for the dot image based on the input image data by referring to the table 462. At that time, when the matching dot pattern is detected, the diameter of the dot is varied at a position of the remarked dot correlated to the dot pattern (step S3B).

Then, when the pattern matching is detected as described above (step 4B), emphasizing processing as correction processing is given a priority by the priority selecting section 45. In this case, detection signal J2 is outputted (step S5B).

If a matching pattern is not detected either in step S4A or in step S4B, default size processing as the correction processing is given a priority (step S5C). This determination is made in the priority selecting section 45 according to a result of pattern matching.

As described above, the priority selecting section 45 determines which output should be selected among various types of output through the correction processing, and prepares a selection signal SEL to instruct the selection of output (step S6). As a result, the switch 51 switches to output from any of the smoothing section 46, character/line-drawing emphasizing section 48, or the default size processing section 49 according to the selection signal SEL sent from the priority selecting section 45, and outputs a video signal to the record engine 5 (step S7).

When a series of processing from step S2 to step S7 ends, and if any window to be put out is remaining, the processing returns to step S2 and the same processing is repeatedly executed.

One examples of pattern matching in the emphasizing block is described. FIGS. 4A to 4D and FIGS. 5A to 5D are views for explaining rules of the emphasizing processing according to Embodiment 1. At first, description is made for dot patterns to be registered in the table 482 with reference to FIGS. 4A to 4D and FIGS. 5A to 5D.

Figure 4A:
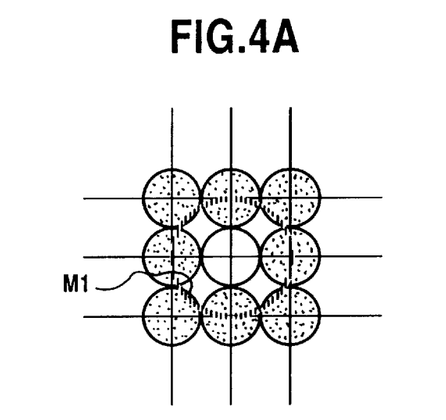
FIGS. 4A to 4D are views for explaining rules of emphasizing processing according to Embodiment 1.
Figure 4B:
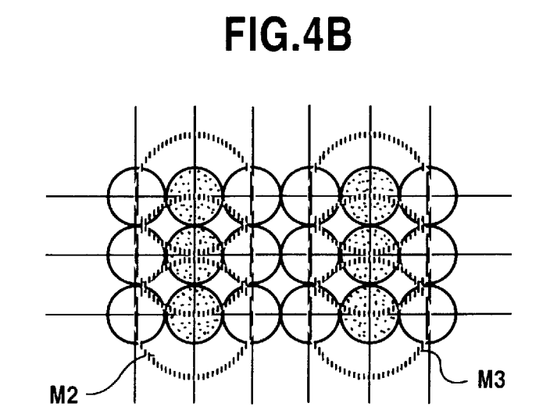
Figure 4C:
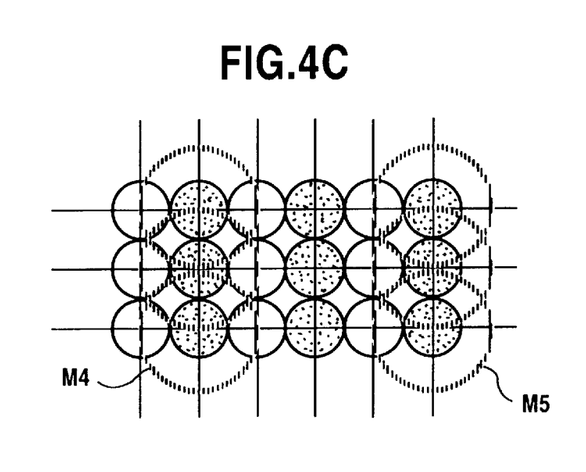
Figure 4D:
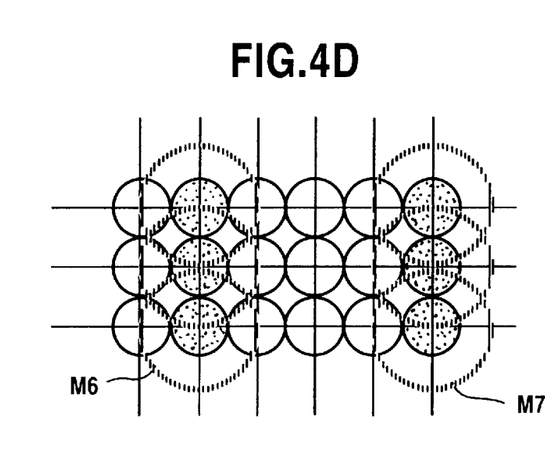

As rules of detecting patterns such as characters in the emphasizing block, there are cases where eight dots (e.g., black dots) around a remarked dot (e.g., white dot) have a different color from that of the remarked dot (Refer to FIG. 4A), where two lines of dots (e.g., white dots) with a different color from that of remarked dots exist between first and second lines of the remarked dots (e.g., black dots) each consisting of one-dotted line (Refer to FIG. 4B), where one line of dots (e.g., white dots) with a different color from that of remarked dots exists among three lines of the remarked dots (e.g., black dots) each consisting of one-dotted line (Refer to FIG. 4C), and where three lines of dots (e.g., white dots) with a different color from that of remarked dots exist between first and second lines of the remarked dots (e.g., black dots) each consisting of one-dotted line (Refer to FIG. 4D).

At first, in the example shown in FIG. 4A, the black dots around the isolated remarked dot are subjected to a correction in size for a size which is smaller than the ordinary diameter of the dots. With this operation, when the remarked dot is corrected the corrected remarked dot M1 can be prevented from being buried in the surrounding dots (black dots) by overlapping the surrounding dots.

Similarly, in the examples shown in FIGS. 4B, 4C and 4D, the diameter of each of the surrounding black dots is corrected to a smaller size, and in this case, lines by corrected remarked dots M2 to M7 can be emphasized so as not to be unclear due to the surrounding dots by overlapping between the corrected remarked dots M2 to M7 and the surrounding dots (black dots).

Figure 5A:
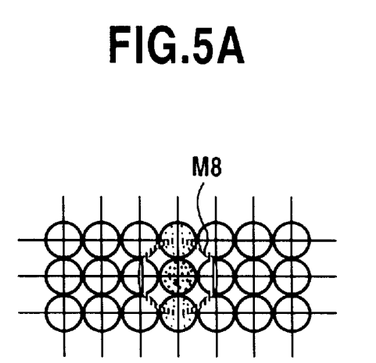
FIGS. 5A to 5D are views for explaining rules of emphasizing processing according to Embodiment 1.
Figure 5B:
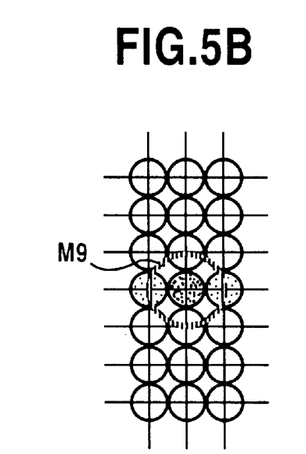
Figure 5C:
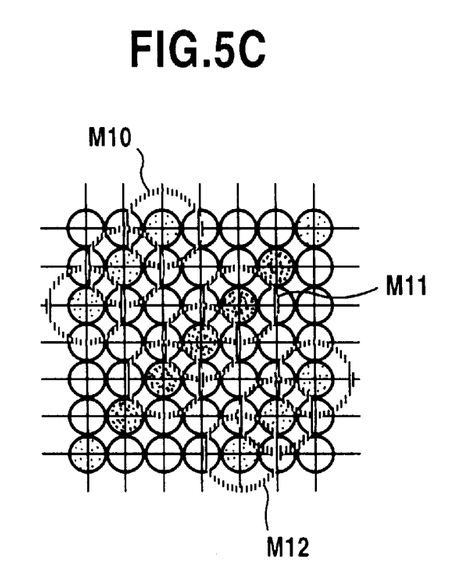
Figure 5D:
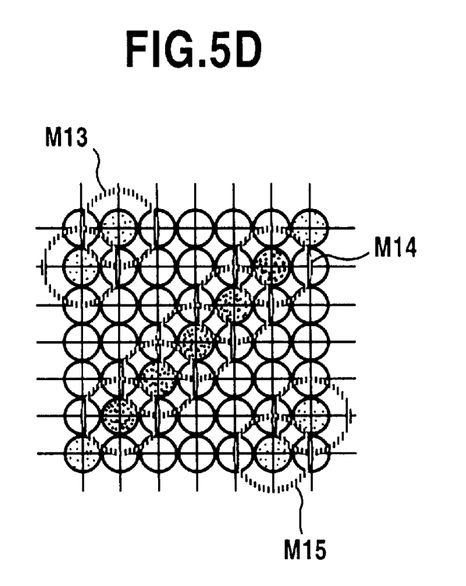

As rules of detecting patterns such as images having a gray scale in the emphasizing block, there are cases where eight dots (e.g., gray and white dots) around a remarked dot (e.g., black dot) have a different color from that of the remarked dot (Refer to FIGS. 5A and 5B), where lines of remarked dots having two different types of gray scale are diagonally aligned and three lines of dots having different gray scale from both of the remarked dots are diagonally aligned between the lines of the remarked dots having the different gray scale from each other (Refer to FIG. 5C), and where lines of remarked dots having two different types of gray scale are diagonally aligned and four lines of dots having different gray scale from both of the remarked dots are diagonally aligned between the lines of the remarked dots having the different gray scale from each other (Refer to FIG. 5D).

At first, in the example shown in FIGS. 5A and 5B, the isolated remarked dot is subjected to correction to a larger size than the ordinary diameter of the dot. With this operation, the corrected remarked dot (black dot) M8 overlaps the surrounding dots (gray dots, white dots), so that the M8 becomes a clear dot and can easily be recognized.

Similarly, in the example shown in FIGS. 5C, each dot diameter of the remarked dots is corrected to a larger size, and the corrected gray remarked dots M10, M12 and corrected black remarked dots M11 overlap the surrounding dots (white dots), and in this case, lines of corrected remarked dots M10 to M12 can also be emphasized so as not to be unclear due to the surrounding dots. It should be noted that the same effect as that in FIG. 5C could also be obtained in FIG. 5D.

Figure 6:
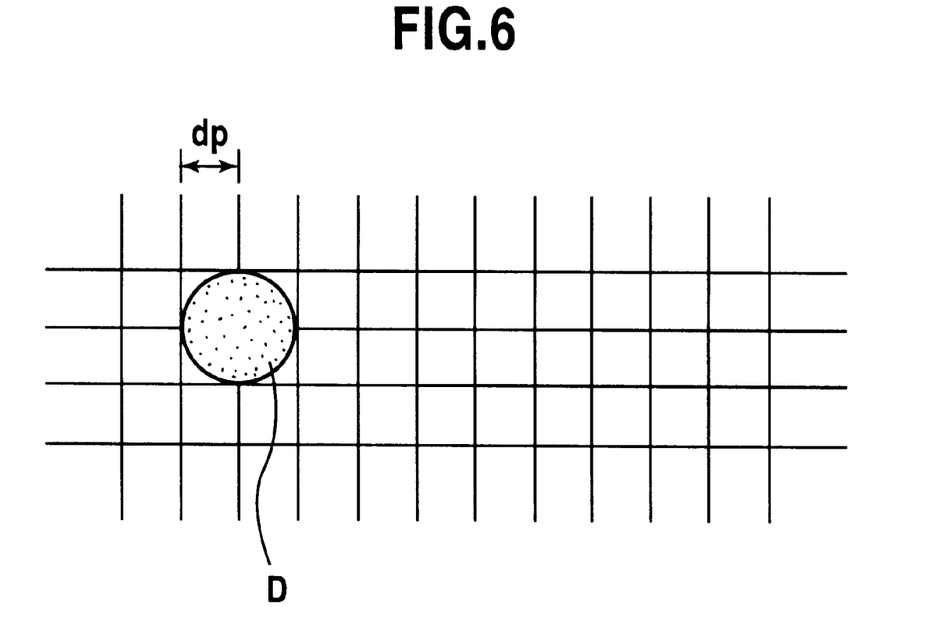
FIG. 6 is a view for explaining a dot diameter when the emphasizing processing according to Embodiment 1 is executed.

Description is made for a result of correction according to the rules of the pattern matching as described above in comparison with the conventional type of output. FIG. 6 is a view for explaining the diameter of a dot when emphasizing processing is executed thereto, and FIGS. 7A to FIGS. 9B are views each for explaining an example of a result of emphasizing processing according to Embodiment 1. In FIG. 6, dp indicates a dot pitch, and D indicates a dot having a diameter thereof obtained by executing the emphasizing processing.

Figure 7A:
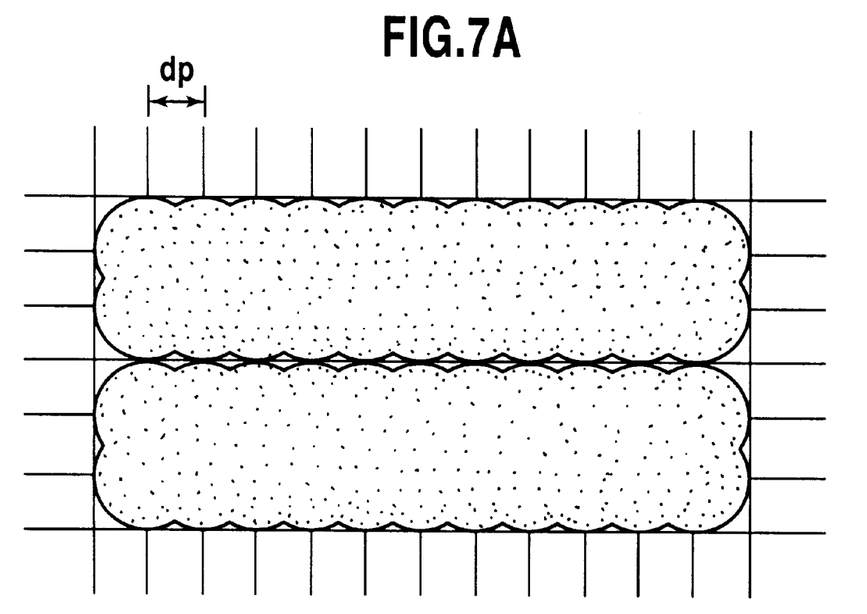
FIGS. 7A and 7B are views for explaining a first example of the result of the emphasizing processing according to Embodiment 1.
Figure 7B:
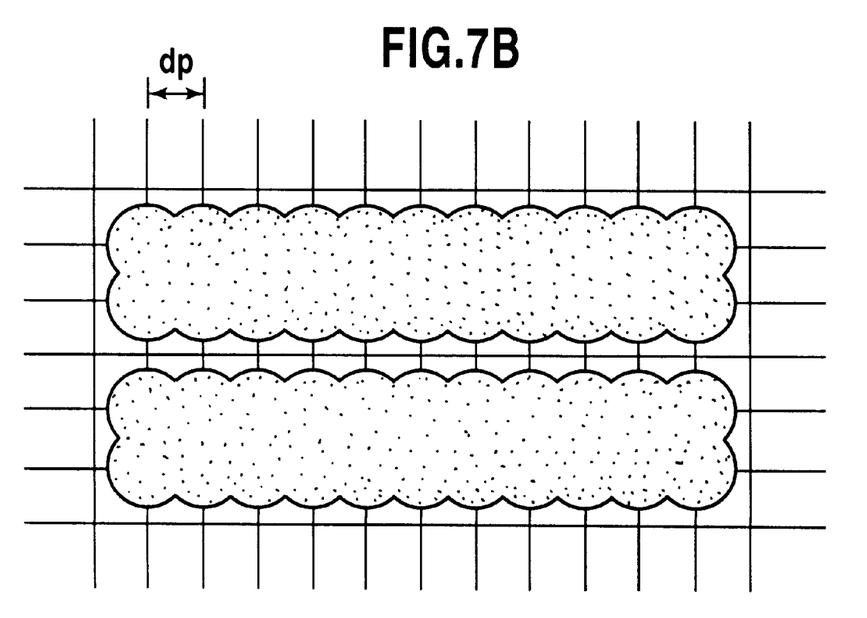

FIG. 7A and FIG. 7B show isolated lines (remarked dots) each formed with one line of open dots before its improvement and after the improvement respectively. This isolated line with one line of open dots is sandwiched with black-dotted lines each consisting of two dots In the vertical direction. Before the improvement, namely, conventionally, the black dot has the same diameter as that of the dot D from the beginning. For this reason, the isolated line with one line of open dots is compressed by the black-dotted lines, which makes it difficult to visually recognize the isolated line. Therefore, when emphasizing processing is to be executed, each dot diameter as a reference for surrounding dots is set to be smaller than the diameter of the dot D, while the diameter of each remarked dot constituting the isolated line with one line of open dots is corrected so as to be larger than the size of the dot D. With this operation, as shown in FIG. 7B, the isolated line with one line of open dots can clearly be reproduced without being compressed.

Figure 8A:
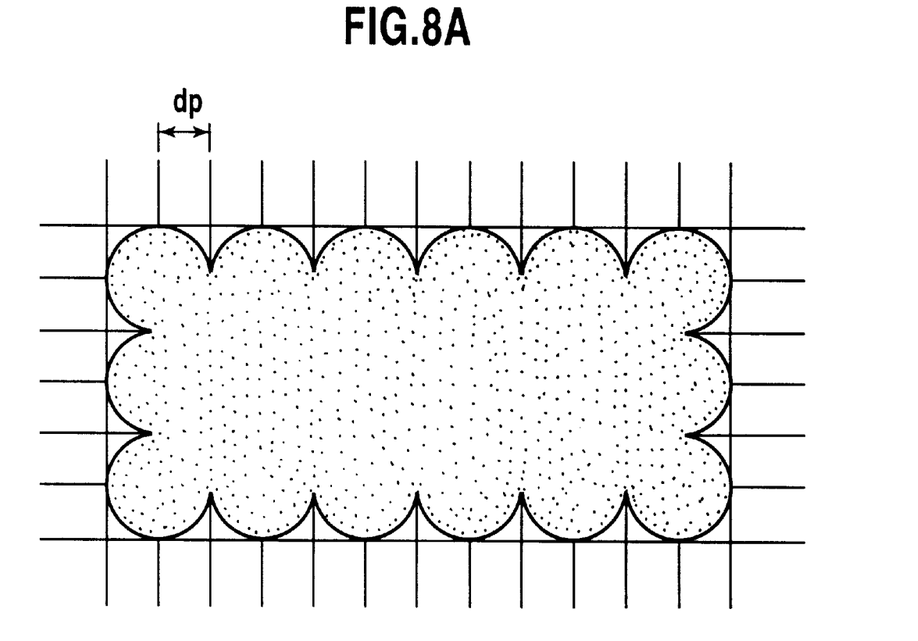
FIGS. 8A and 8B are views for explaining a second example of the result of the emphasizing processing according to Embodiment 1.
Figure 8B:
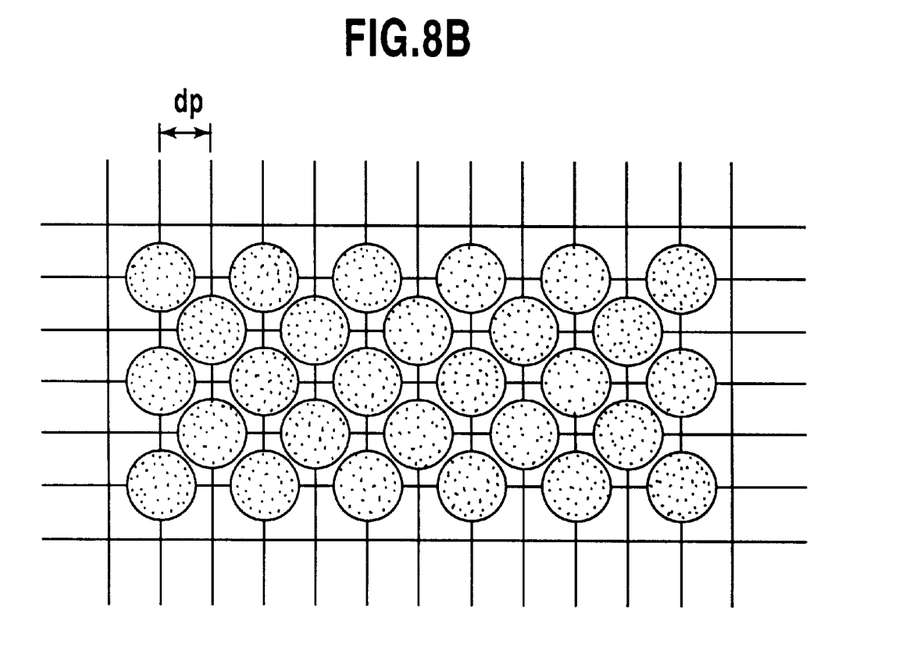

FIG. 8A and FIG. 8B show checkered patterns before its improvement and after the improvement respectively. This checkered pattern is obtained by alternately arranging white and black dots. Before the improvement, namely, conventionally, the black dot has the same diameter as that of the dot D. For this reason, the white dots are compressed by the black dots, so that the checkered pattern is reproduced as a solidly shaded pattern with black, which makes it difficult to visually recognize it as the checkered pattern. Therefore, when emphasizing processing is to be executed, assuming the white dots as remarked dots, each dot diameter as a reference for black dots as surrounding dots is set to be smaller than the diameter of the dot D, and then the processing of exposing space with the white dots is executed.

Namely, the processing described above is not only a processing in which the white dots are simply made larger than the black dots, but is the processing in which a size of each dot is changed so that an area of each dot becomes an area depending on a logical number of dots, with which it is possible to reproduce a checkered pattern as well as to faithfully reproduce density as a whole. With this operation, as shown in FIG. 8B, the white dots constituting the checkered pattern is not compressed by the surrounding black dots, and the checkered pattern with the black and white dots in balance can be reproduced.

Figure 9A:
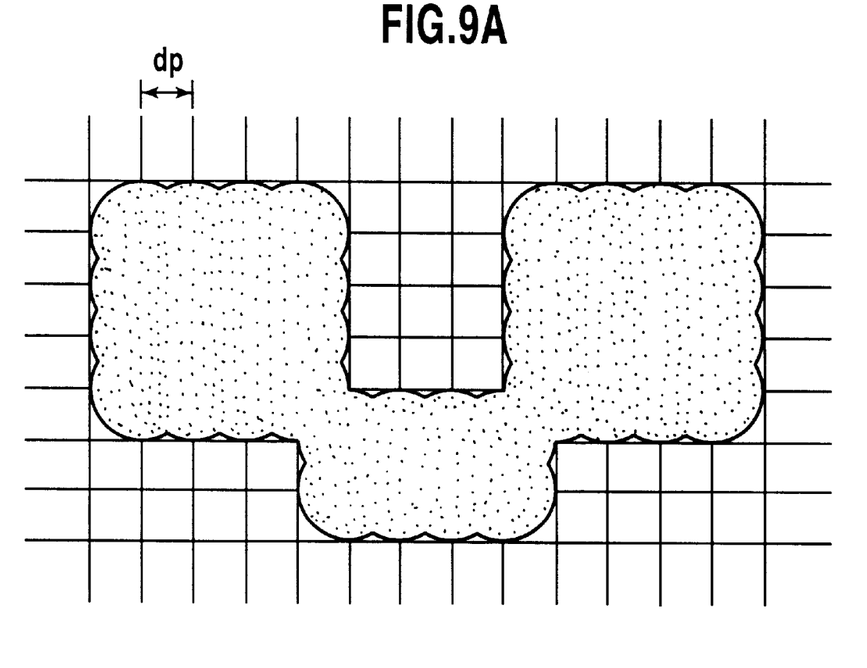
FIGS. 9A and 9B are views for explaining a third example of the result of the emphasizing processing according to Embodiment 1.
Figure 9B:
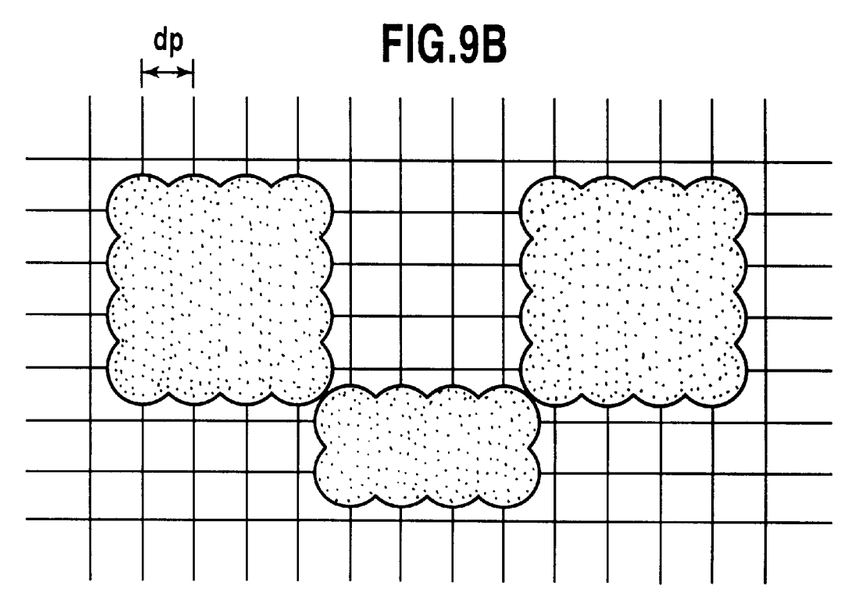

FIG. 9A and FIG. 9B each show a portion of a dot pattern before its improvement and after the improvement respectively. The portion of this dot pattern is obtained by alternately arranging white and black dot groups. Before the improvement, namely, conventionally, the black dot has the same diameter as that of the dot D. For this reason, each connected part between the black dot groups is unclear so that there is no effective clearness on each boundary therebetween, which makes it difficult to visually recognize it as the dots pattern. Therefore, when emphasizing processing is to be executed, assuming the white dots as remarked dots, each dot diameter as a reference for black dots as surrounding dots is set to be smaller than the diameter of the dot D, and then the processing of exposing space with the white dots is executed.

Namely, the processing of improving density reproducibility is executed by giving effective clearness to each connected part between the black dot groups. With this operation, as shown in FIG. 9B, the white dot groups constituting each dots pattern is not unnecessarily compressed by each of the black dot groups, and each dot pattern with the black and white portions in balance is reproduced. Consequently, tone reproducibility of a dot image is improved.

As described above, with Embodiment 1, a correlation between each dot diameter and each position of remarked dots to be varied for each dot pattern is previously stored, and when a dot pattern matching a dot pattern based on inputted dot image data is detected, especially a dot diameter corresponding to the position of the remarked dot in the dot pattern is varied and corrected, so that a dot image appropriate for a dot pattern can be formed, and with this feature, it is possible to improve reproducibility of image quality according to characteristics of an output image.

It should be noted that, in the emphasizing processing, controls are also provided for movement of a dot position, and therefore, an optimal result of the emphasizing processing can be obtained. In addition, when error dispersion processing is executed for image processing, specific texture and a reverse phenomenon of density are reduced in an area with intermediate density generated because a dot diameter becomes larger than a dot pitch, and for this reason, image quality can be improved.

A dot diameter is varied and corrected in each dot pattern in which a single remarked dot or remarked dots aligning in any of horizontal, vertical or diagonal directions are surrounded by dots having a different color or gray scale from that of remarked dot or dots, and in which between first and second lines of remarked dots is spaced by at least three lines or more with dots having a different color or gray scale from that of the remarked dots, so that it is possible to reproduce a point of a remarked dot and a line with remarked dots so that the point and the line can be recognized without being filled up by the surrounding dots having a different color or gray scale, and appropriately maintain each density of image patterns.

As higher priority is given to the smoothing processing than the emphasizing processing, especially the correction by moving dots is preferentially executed than the correction to vary a dot diameter, so that image quality of an outside shape can preferentially be improved. It should be noted that the smoothing also includes the steps of not only controlling a position of a dot but also controlling variation of a dot diameter by setting a small black dot as a reference by considering the surrounding conditions.

In Embodiment 1, a range in which a state of a dot pattern can be recognized will be limited depending on a put-out size of a window. That is because each edge section between white dots and black dots may be formed with open characters, a part of black characters, or a part of a line drawing. Further, the edge section may be a part of an image. In those cases, as the edge section is a boundary between the white and black, a dot diameter having a size exactly in between the white dot and black dot may be obtained so that the white side or the black side will become thinner.

In the pulse width modulation used for the smoothing processing, when speed of an internal clock is several times faster as compared to that of an external clock, the operation of the circuit can not keep pace with the speed, which makes it difficult to output an image with high-quality gray scale. Therefore, the problem described above will be solved by providing two-step control to the modulation. Namely, at first, a pulse width set value is digitally divided by using a high frequency clock in a possible range. Further, a plurality of pulses obtained by adding a delay through a delay line to each of the divided values are generated, and those pulses are combined to prepare a new pulse width.

As described above, it is possible to realize controls for a multi-step pulse width based on a range in which a digitized operation is possible. It should be noted that, by setting to be selectable from this multi-step pulse width in order to reproduce an image with high precision, support for the record engine with a differently designed value for processing is also possible.

Figure 10:
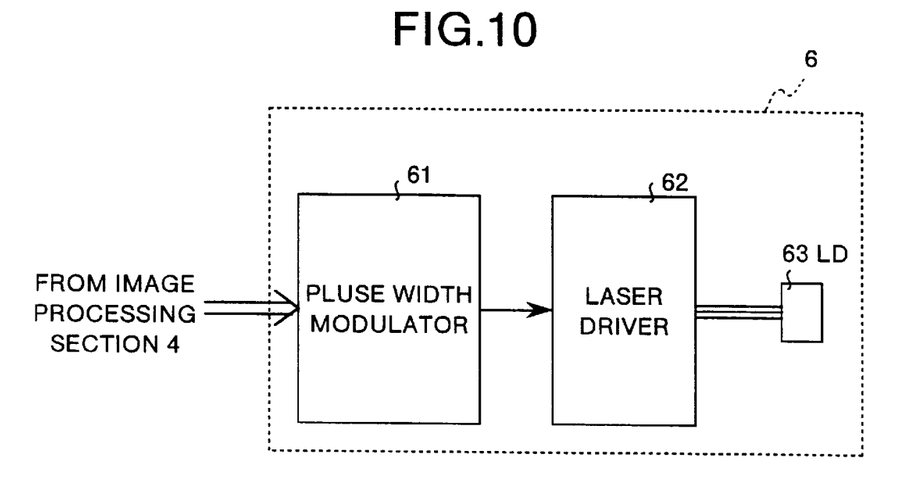
FIG. 10 is a block diagram showing a laser driving method for an image forming apparatus according to Embodiment 2.

In the present invention of the image forming apparatus, a record engine may be realized based on a pulse width modulation scheme like in Embodiment 2 described below. Next description is made for a laser driving method according to Embodiment 2. FIG. 10 is a block diagram showing a laser driving method for an image forming apparatus according to Embodiment 2, and the reference numeral 6 in the figure indicates a record engine.

The laser driving method according to Embodiment 2 employs a pulse width modulation scheme. Therefore, the record engine 6 comprises, as shown in FIG. 10, a pulse width modulator 61, a laser driver 62, and a light head (LD) 63. In this record engine 6, when a pulse width modulation rate for specifying a dot diameter is received together with a video signal from the image processing section 4, the input video signal is subjected to pulse width modulation in the pulse width modulator 61, and a laser beam is emitted from the light head 63 by driving the laser driver 62.

As described above, in Embodiment 2, it is possible to realize correction of a dot diameter especially with pulse width modulation based on the configuration in Embodiment 1.

Figure 11:
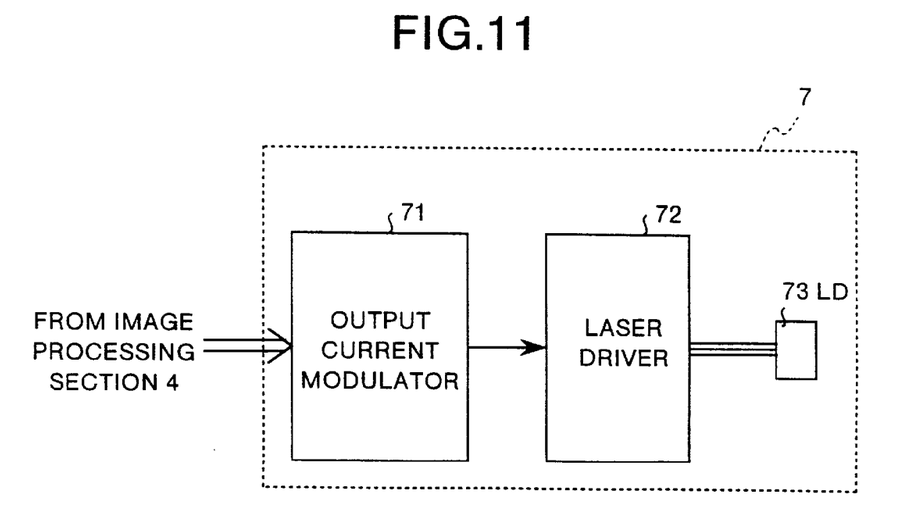
FIG. 11 is a block diagram showing a laser driving method for an image forming apparatus according to Embodiment 3.

In the present invention of the image forming apparatus, a record engine may be realized based on an output current modulation scheme like in Embodiment 3 described below. Next description is made for a laser driving method according to Embodiment 3. FIG. 11 is a block diagram showing a laser driving method for an image forming apparatus according to Embodiment 3, and the reference numeral 7 in the figure indicates a record engine.

The laser driving method according to Embodiment 3 employs an output current modulation scheme. Therefore, the record engine 7 comprises, as shown in FIG. 11, an output current modulator 71, a laser driver 72, and a light head (LD) 73. In this record engine 7, when a current value for specifying a dot diameter is received together with a video signal from the image processing section 4, an output current of the input video signal is modulated in the output current modulator 71, and a laser beam is emitted from the light head 73 by driving the laser driver 72.

As described above, in Embodiment 3, it is possible to realize correction of a dot diameter especially with output current modulation based on the configuration in Embodiment 1.

Figure 12:
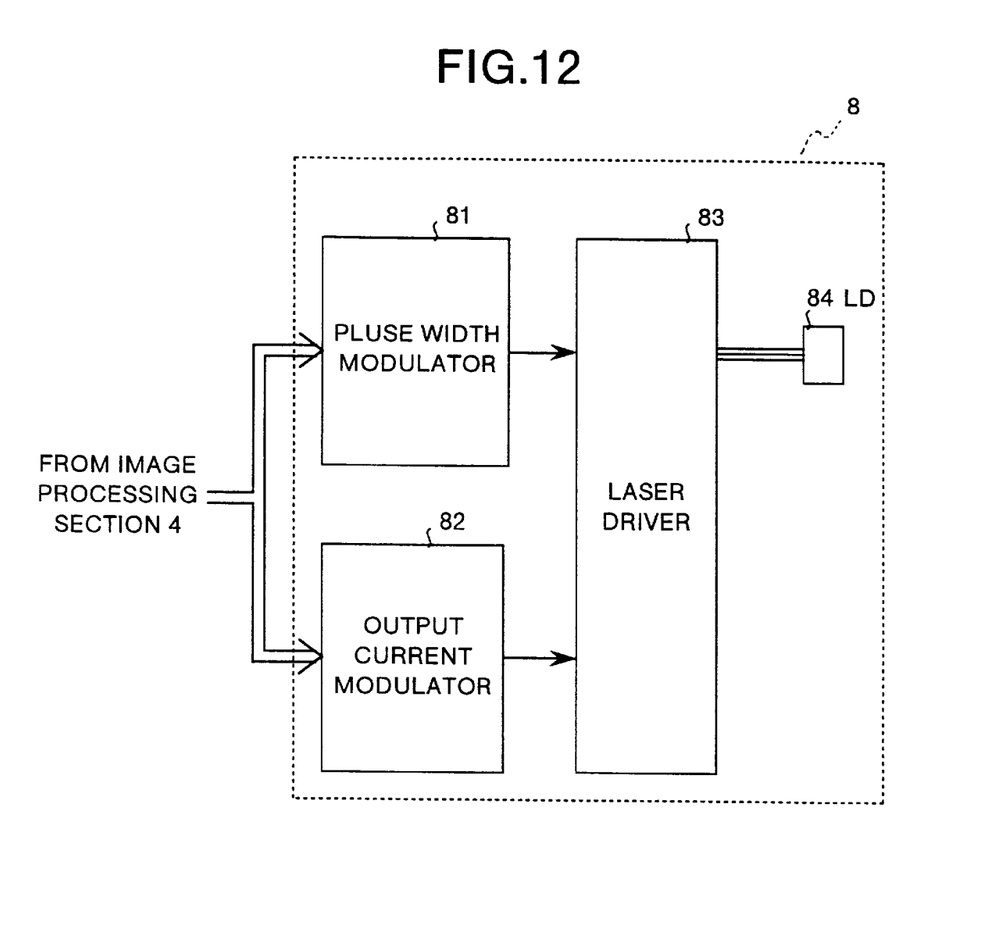
FIG. 12 is a block diagram showing a laser driving method for the image forming apparatus according to Embodiment 4.

In the present invention on the image forming apparatus, a record engine may be realized based on a combination of the pulse width modulation scheme with the output current modulation scheme like in Embodiment 4 described below. Next description is made for a laser driving method according to Embodiment 4. FIG. 12 is a block diagram showing a laser driving method for an image forming apparatus according to Embodiment 4, and the reference numeral 8 in the figure indicates a record engine.

The laser driving method according to Embodiment 4 employs both of the pulse width modulation scheme and the output current modulation scheme. Therefore, the record engine 8 comprises, as shown in FIG. 12, a pulse width modulator 81 an output current modulator 82, a laser driver 83, and a light head (LD) 84. In this record engine 8, when a pulse width modulation rate for specifying a dot diameter is received together with a video signal from the image processing section 4, the input video signal is subjected to pulse width modulation in the pulse width modulator 81, and a laser beam is emitted from the light head 84 by driving the laser driver 83.

Also, when an current value for specifying a dot diameter is received together with a video signal from the image processing section 4, an output current of the input video signal is modulated in the output current modulator 82 like in Embodiment 3, and a laser beam is emitted from the light head 84 by driving the laser driver 83.

As described above, in Embodiment 4, as the invention here can support the pulse width modulation scheme and the output current modulation scheme, it is possible to realize correction of a dot diameter with both of the schemes based on the configuration in Embodiment 1.

In addition, when the pulse width modulation scheme and the output current modulation scheme are combined, control capability of modulation can be increased as compared to the case where each modulation is executed by itself respectively. Especially, when a modulation frequency becomes high, speed of an element for controlling modulation only based on the pulse width modulation is not quick enough, which makes the modulation difficult, but the problem can be resolved with the help of output current modulation.

Further, if each of a dot position (depending on a light-emitting timing) and a dot diameter (a size of a dot) is controlled by the pulse width modulation and output current modulation respectively, correction of a dot can independently be controlled. Consequently, control of a size as well as a position of a dot can accurately be executed, and image quality can largely be effected.

Although each description has assumed the case referred to outputting for recording in Embodiments 1 to 4, the present invention is not limited to the above cases, and applicable also to a case referred to outputting for display such as a CRT. In this case, emission strength may be corrected with variations in intensity like the correction of the dot diameter as described above.

In addition, the present invention is applicable not only to a laser-beam printer but also to an ink-jet printer and a thermal printer or the like. When applied to an ink-jet printer, by changing a voltage waveform or a current waveform to be loaded on a piezo-electricity element when ink particles are to be generated, a size of an ink particle can be controlled. With this feature, a dot diameter can be corrected.

It should be noted that a heating value could be controlled for each dot in the thermal type called bubble-jet type of ink-jet method. When applied to a thermal printer, similar control may be provided.

Although appropriate correction for the priority is performed according to a dot pattern based on inputted dot image data in the embodiment, the present invention is not limited to the embodiment, and there may be provided a logic operating section for obtaining one output by performing logic operations (e.g., a combination of circuits such as AND and OR) of each output result from the smoothing section 46, character/line-drawing emphasizing section 48, and the default size processing section 49 respectively without determination on the priority (omission of the priority selecting section 45) or switching (omission of the switch 51) in response to the priority.

In this case, in the logic operating section, the same input dot image data is inputted to the smoothing section 46, character/line-drawing emphasizing section 48 and the default size processing section 49 at the same time, and correction output can logically and directly be obtained, so that the processing can be more speeded up than that in the embodiments.

If the logic operating section is divided into the smoothing section 46, character/line-drawing emphasizing section 48 and the default size processing section 49 each of which is provided so as to independently operate respectively, the priority selecting section 45 and the switch 51 are required to be used like in the embodiments. In that case, the smoothing processing, emphasizing processing and default processing are concurrently proceeded, and the priority selecting section 45 can acquire detection signals J1 and J2 at the same time and can also output correction output to the switch 51. Namely, as a plurality of logic operating sections operate in parallel, even if the priority selecting section 45 and the switch 51 are used, the processing can be more speeded up than that in the embodiments.

Although the present invention has been described with respect to specific embodiments for a complete and clear disclosure, the appended claims are not be thus limited but are to be construed as embodying all modifications and alternative constructions that may occur to one skilled in the art which fairly fail within the basic teaching herein set forth.

As described above, with the present invention, a correlation between each dot diameter and each position of remarked dots to be varied for each dot pattern is previously stored, and when a dot pattern matching a dot pattern based on inputted dot image data is detected, a dot diameter corresponding to the position of the remarked dot in the dot pattern is varied and corrected, so that a dot image appropriate for a dot pattern can be formed, and with this feature, it is possible to obtain an image forming apparatus which can improve reproducibility of image quality according to characteristics of an output image.

With the present invention, a dot diameter is varied and corrected in each dot pattern in which a single remarked dot or remarked dots aligned in any of horizontal, vertical or diagonal directions are surrounded by dots having a different color or gray scale from that of remarked dot or dots, and in which between first and second lines of remarked dots have at least three or more lines with dots having a different color or gray scale from that of the remarked dots, so that it is possible to obtain an image forming apparatus which can reproduce a point of a remarked dot and a line with remarked dots so that the point and the line can be recognized without being filled up by the surrounding dots having a different color or gray scale, and which can appropriately maintain the density of the image pattern.

With the present invention, an output dot image is formed by performing pulse width modulation, output current modulation or both to the dot image data in which the dot diameter has been varied and corrected, so that it is possible to obtain an image forming apparatus which can realize image formation optimal to an output mode.

With the present invention, when a dot pattern matching that in dot pattern groups each having a different priority is detected in the inputted dot image data, dot image data corrected by using the highest priority dot pattern group is selected and outputted, so that optimal correction can be performed as required according to the state of the input dot image, and with this feature, it is possible to obtain an image forming apparatus which can preferentially improve image quality of an outside shape.

With the present invention, when a matching dot pattern is not detected, each dot diameter based on the inputted dot image data is corrected to the default size, and the corrected dot image data is selected and outputted, so that any input dot image having no specified dot pattern can even be subjected to a minimum default correction, and with this feature, it is possible to obtain an image forming apparatus which can improve image quality of an outside shape even in any of input dot images.

With the present invention, a dot diameter is varied and corrected in each dot pattern in which a single remarked dot or remarked dots aligned in any of horizontal, vertical or diagonal directions are surrounded by dots having a different color or gray scale from that of remarked dot or dots, and in which between first and second lines of remarked dots have at least three or more lines with dots having a different color from that of the remarked dots, so that it is possible to obtain an image forming apparatus which can reproduce a point of a remarked dot and a line with remarked dots so that the point and the line can be recognized without being filled up by the surrounding dots having a different color or gray scale, and which can appropriately maintain the density of the image pattern.

With the present invention, an output dot image is formed by performing pulse width modulation, output current modulation or both to the selected and outputted dot image data, so that it is possible to obtain an image forming apparatus which can realize image formation optimal to an output mode.

With the present invention, when a dot pattern based on inputted dot image data requires both of smoothing processing and emphasizing processing, the smoothing processing is preferentially outputted over the emphasizing processing, so that optimal correction can be performed as required according to the state of input dot image, and with this feature, it is possible to obtain an image forming apparatus which can preferentially improve the image quality of an outside shape.

With the present invention, when a corresponding dot pattern is not detected, dot diameter based on inputted dot image data is corrected to the default size, and the corrected dot image data is selected and outputted, so that any input dot image having a dot pattern not required to be subjected to smoothing processing and emphasizing processing can even be subjected to minimum default correction, and with this feature, it is possible to obtain an image forming apparatus which can improve the image quality of an outside shape even in any of input dot images.

This application is based on Japanese patent application No. HEI 10-019697 filed in the Japanese Patent Office on Jan. 30, 1998, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image forming apparatus for forming a dot image comprising:
   a storing unit for previously storing therein a correlation between diameter of dots and position of remarked dots to be varied for each dot pattern;
   a detecting unit for detecting a dot pattern matching a dot pattern based on inputted dot image data among a plurality of dot patterns stored in said storing unit; and
   a dot-diameter correcting unit for varying and correcting, when the matching dot pattern is detected by said detecting unit, a diameter of the dot in said inputted dot image data corresponding to the position of the remarked dot stored in said storing unit in correlation to said matching dot pattern.

2. An image forming apparatus according to claim 1; wherein a plurality of dot patterns stored in said storing unit may include a case where a single remarked dot or remarked dots aligning in any of horizontal, vertical or diagonal directions are surrounded by dots having a different color or gray scale from that of the corresponding remarked dot or dots, and a case where between first and second lines of remarked dots is spaced by at least three lines or more with dots having a different color or gray scale from that of the corresponding remarked dots.

3. An image forming apparatus according to claim 2 further comprising an image forming unit for forming an output dot image by performing pulse width modulation, output current modulation or both of the modulations to the dot image data obtained by said dot-diameter correcting unit.

4. An image forming apparatus for forming a dot image comprising:
   a storing unit for preparing dot pattern groups for each priority in correlation to each priority on correction to dot images, and previously storing therein a correlation between dot image data and each position of remarked dots to be corrected for each dot pattern group;
   a detecting unit for detecting a dot pattern matching a dot pattern based on inputted dot image data for each of the dot pattern groups stored in said storing unit;
   a correcting unit for correcting, when the matching dot pattern is detected by said detecting unit, any of dot image data in said inputted dot image data corresponding to the position of the remarked dot stored in said storing unit in correlation to said matching dot pattern; and
   a selecting unit for selecting and outputting, when a dot pattern matching to that in two or more of dot pattern groups among said plurality of dot pattern groups is detected by said detecting unit, the dot pattern corrected by said correcting unit using the highest-priority dot pattern of said two or more of dot pattern groups.

5. An image forming apparatus according to claim 4 further comprising a default size correcting unit for correcting, when any matching dot pattern is not detected by said detecting unit, the diameter of the dot based on said inputted dot image data to a default size; wherein said selecting unit selects and outputs, when any matching dot pattern is not detected by said detecting unit, the dot image data corrected by said default size correcting unit.

6. An image forming apparatus according to claim 4; wherein a plurality of dot pattern groups stored in said storing unit may include a case where a single remarked dot or remarked dots aligning in any of horizontal, vertical or diagonal directions are surrounded by dots having a different color or gray scale from that of the corresponding remarked dot or dots, and a case where between first and second lines of remarked dots is spaced by at least three lines or more with dots having a different color or gray scale from that of the corresponding remarked dots.

7. An image forming apparatus according to claim 4 further comprising an image forming unit for forming an output dot image by performing pulse width modulation, output current modulation or both of the modulations to the dot image data outputted by said selecting unit.

8. An image forming apparatus for forming a dot image by using smoothing processing for correction to move a position of a dot or to vary a dot diameter or the like as well as emphasizing processing for correction to move a position of a dot or to vary a dot diameter or the like; said apparatus comprising:

a determining unit for determining that a dot pattern based on inputted dot image data corresponds to any of dot patterns requiring the smoothing processing, emphasizing processing, or both of the processing;

a priority selecting unit for preferentially selecting, when it is determined by said determining unit that the dot pattern requires at least smoothing processing, the smoothing processing, while preferentially selecting, when it is determined by said determining unit that the dot pattern requires only emphasizing processing, the emphasizing processing;

a switch selection for switching to a higher-priority processing selected by said priority selecting unit between said smoothing processing and said emphasizing processing, and outputting the selected one; and default size processing for correcting a dot diameter to the default size; wherein said priority selecting unit preferentially selecting, when it is determined by said determining unit that there is no corresponding dot pattern, the default size processing, and said switching unit switches to the highest-priority processing selected by said priority selecting unit among said smoothing processing, emphasizing processing and default size processing, and outputs the selected one.

* * * * *